April 2, 1935. J. A. FERN 1,996,412
PHONOGRAPH RECORD FEEDING MEANS AND METHOD
Filed April 17, 1930 9 Sheets-Sheet 7
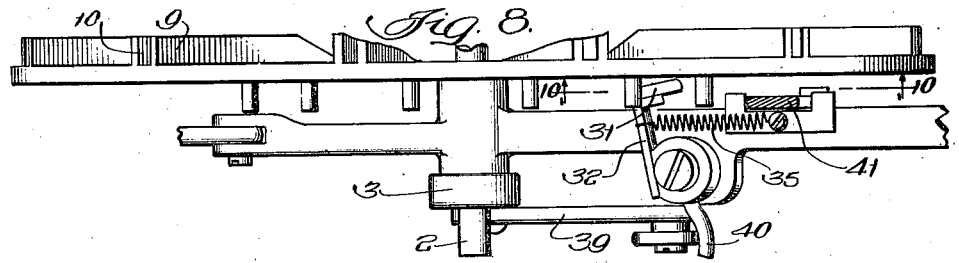
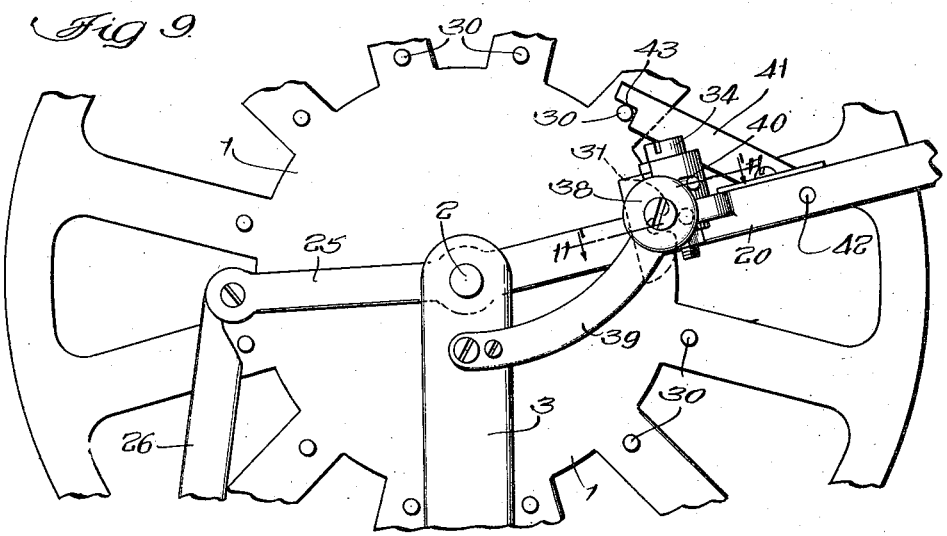
Inventor
John A. Fern April 2, 1935.  J. A. FERN  1,996,412

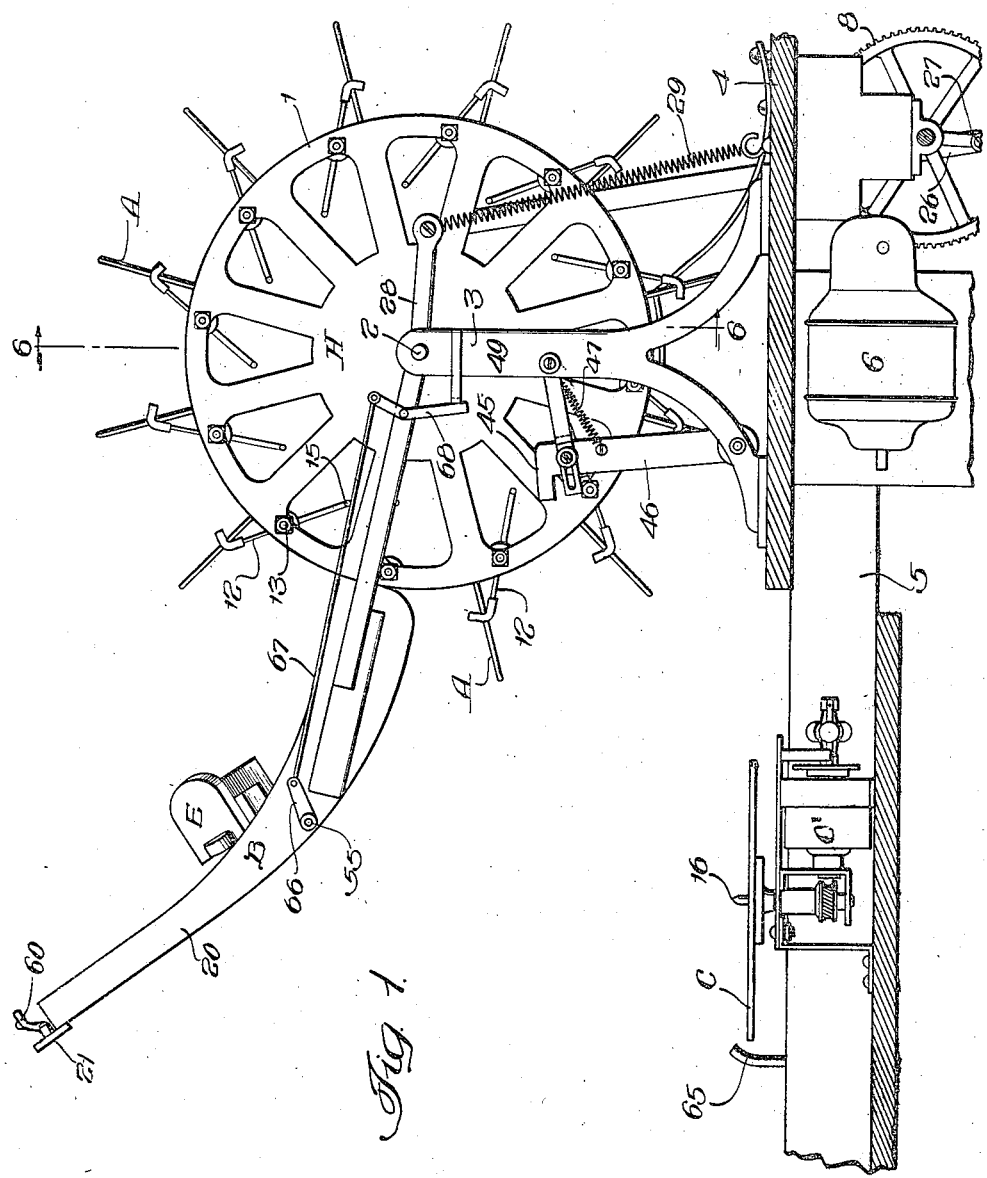

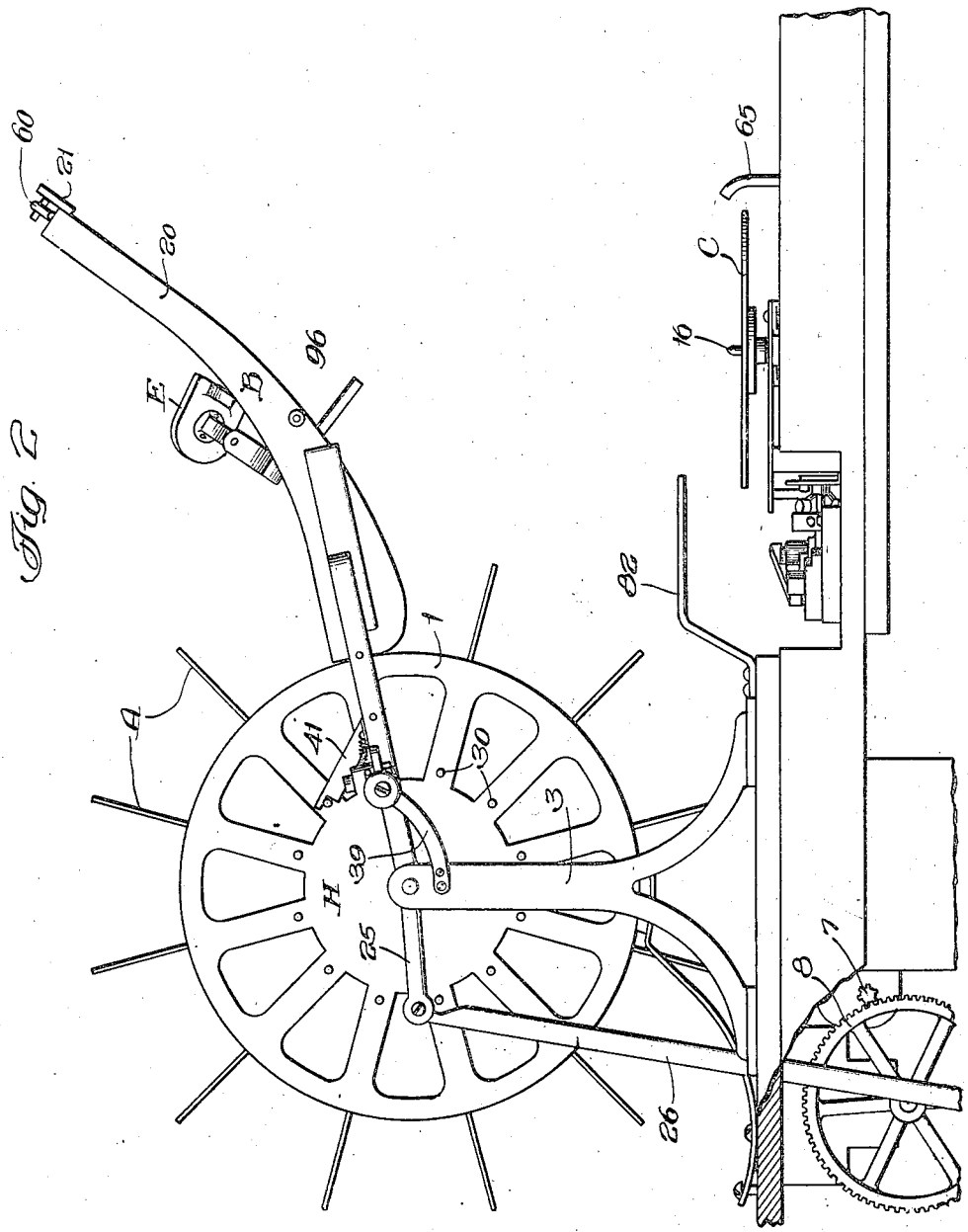

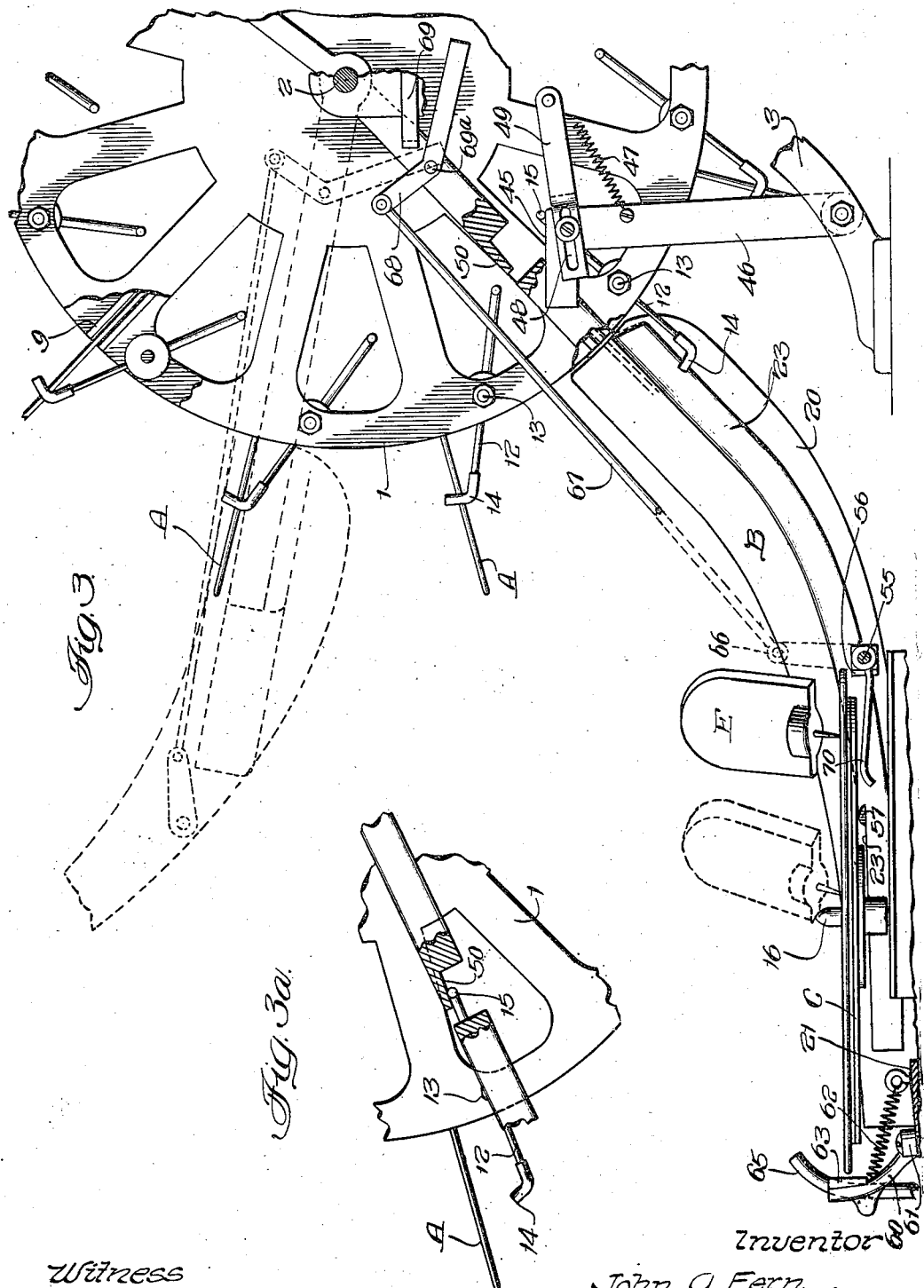

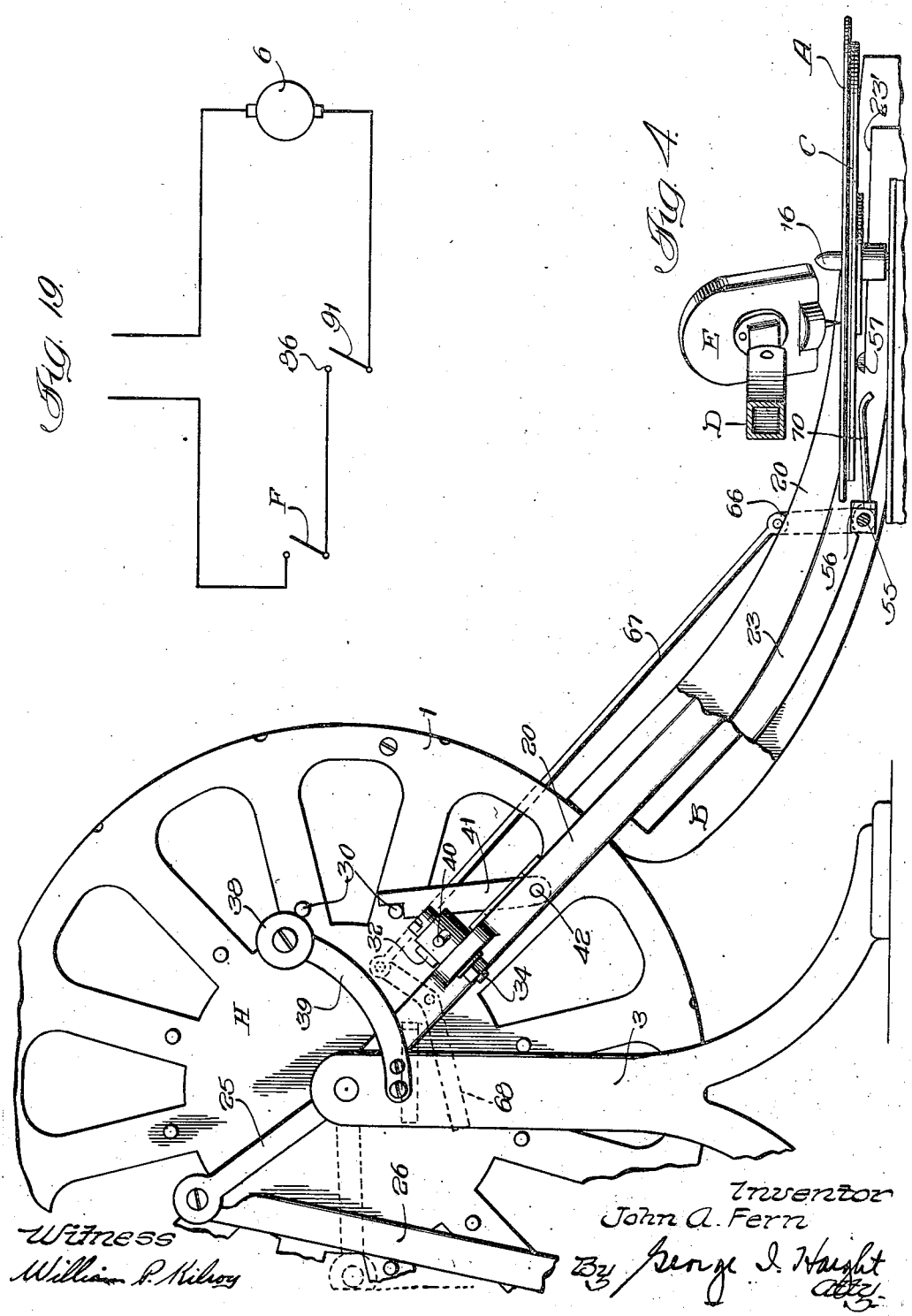

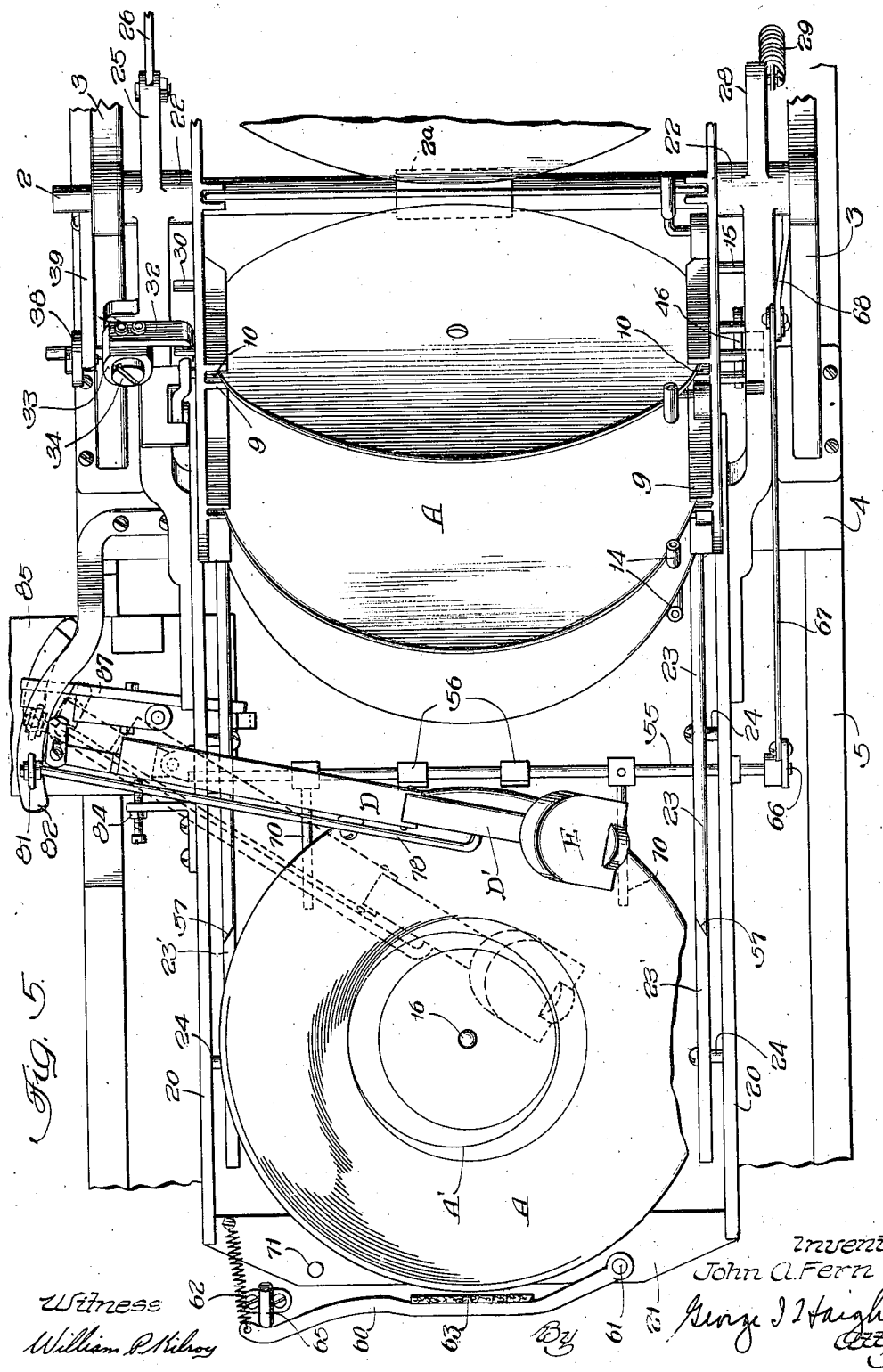

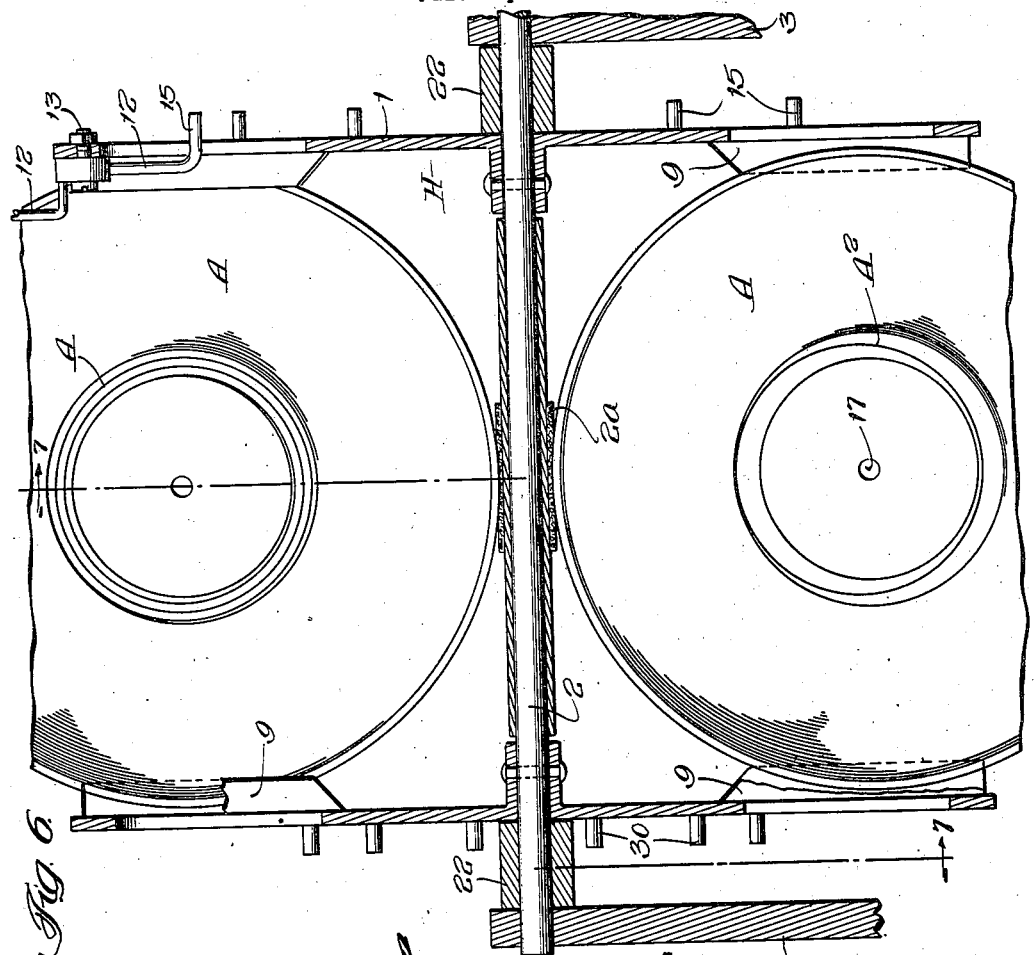
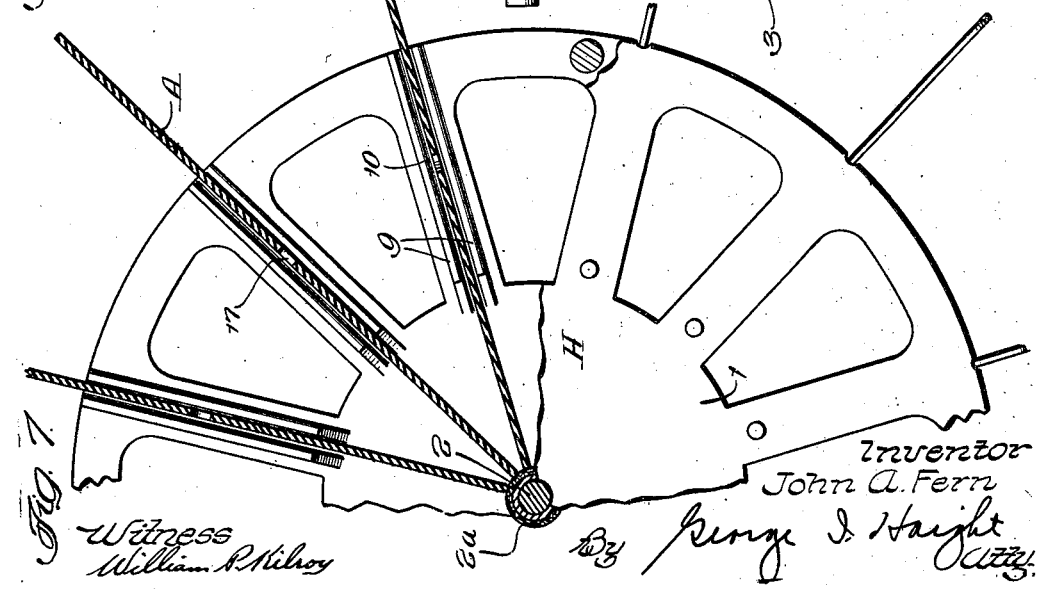

PHONOGRAPH RECORD FEEDING MEANS AND METHOD

Filed April 17, 1930   9 Sheets-Sheet 8

Inventor
John A. Fern
By George I. Haight
Atty.

Witness
William P. Kilroy

April 2, 1935.  J. A. FERN  1,996,412
PHONOGRAPH RECORD FEEDING MEANS AND METHOD
Filed April 17, 1930  9 Sheets-Sheet 9
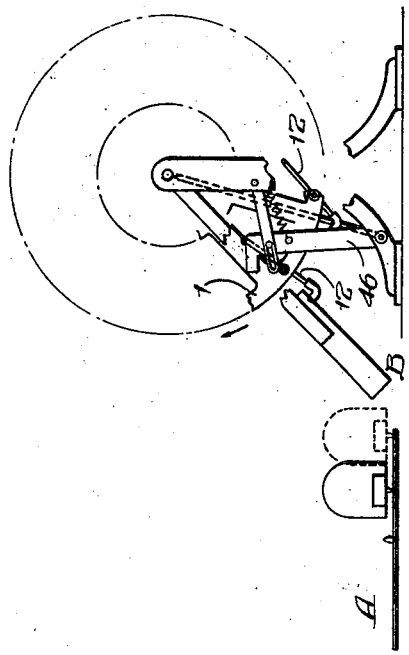
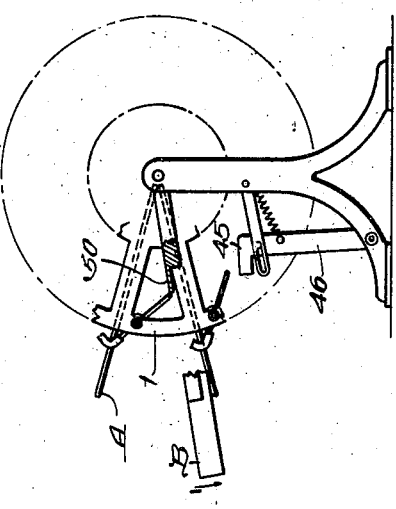
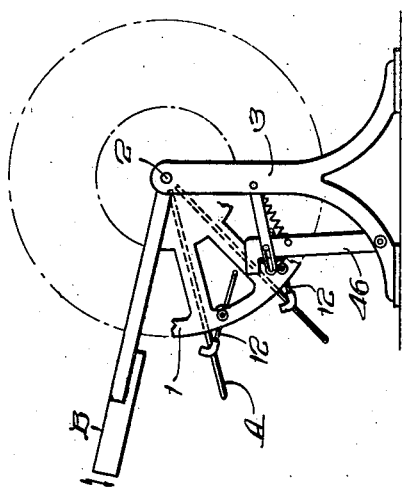
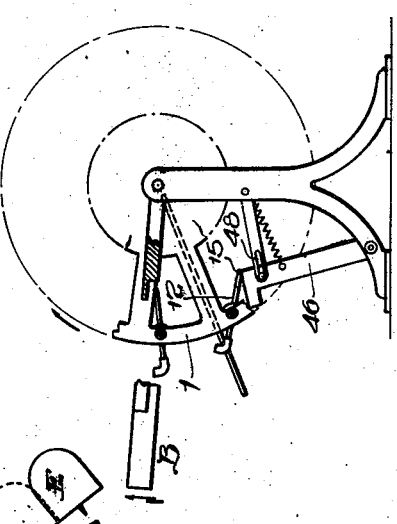
Witness
William P. Kilroy
Inventor
John A. Fern Patented Apr. 2, 1935

1,996,412

UNITED STATES PATENT OFFICE 1,996,412

PHONOGRAPH RECORD FEEDING MEANS AND METHOD

John A. Fern, Chicago, Ill., assignor, by direct and mesne assignments, to J. P. Seeburg Corporation, Chicago, Ill., a corporation of Illinois Application April 17, 1930, Serial No. 444,965

20 Claims. (Cl. 274—10)

This invention relates to a method of and mechanism for feeding phonograph records from a group to playing position and returning them to their position in the group after they have been played.

The object of the invention broadly is to utilize the action of gravity to effect the transfer of the records to and from the group, and to provide means for handling the records in a manner that subjects them to the action of gravity for this purpose.

A further object is to provide a magazine for the group of records and automatic means by which the records will be removed individually from the magazine, transferred to playing position in the phonograph table, and then returned to the magazine, my object being further to provide a machine of this character which will accomplish these results with respect to successive records in the magazine or with respect to any record or records selected to be played.

A further object is to utilize the action of gravity in transferring the records to and from the magazine and thereby eliminate entirely the use of any mechanical gripping or holding devices for moving the individual records through their several movements.

A further object is to provide a mechanism of the above characteristics, which is simple and rugged and involves few operating parts in its construction, and is comparatively inexpensive to manufacture.

Other objects of the invention will appear hereinafter.

Referring to the accompanying drawings in which one embodiment of the invention is shown:

Fig. 1 is a view in front elevation of a phonograph record feeding mechanism, embodying the invention;

Fig. 2 is a view in rear elevation of the structure shown in Fig. 1;

Fig. 3 is an enlarged view in front elevation of the chute or guideway in its lowered position and a portion of the record magazine;

Fig. 3a is a detail of the retaining finger restoring means;

Fig. 4 is a view similar to Fig. 3, but taken from the rear of the machine;

Fig. 5 is an enlarged plan view of the portion of the structure shown in Fig. 3, showing a record in playing position on the rotary table;

Fig. 6 is an enlarged transverse vertical section of the record magazine substantially on the line 6—6 of Fig. 1;

Fig. 7 is a vertical view of the record magazine substantially on the staggered line 7—7 of Fig. 6, showing part of the structure in section and part in elevation;

Fig. 8 is an enlarged detail plan of the rear side of the magazine showing the clutch in operative relation to the guideway and the magazine;

Fig. 9 is a fragmentary detail elevation of the mechanism shown in Fig. 8;

Fig. 10 is an enlarged detail vertical section on the line 10—10 of Fig. 8;

Fig. 11 is a detail horizontal section on the line 11—11 of Fig. 9;

Fig. 12 is a transverse vertical section on the line 12—12 of Fig. 5, through the frame of the machine and the record on the table, and showing the reproducing device and the controlling switch mechanism operated thereby;

Fig. 13 is a view looking down upon the controlling switch shown in Fig. 12, showing the reproducer arm in relation thereto, but omitting the reproducer lifting lever for the sake of clearness;

Fig. 14 is a view similar to Fig. 13, showing the parts in a different operative relation;

Figs. 15, 16, 17, and 18 are diagrammatic views showing the relation of the chute or guideway, the record magazine, and the record retaining and releasing means in different stages of operation; and Fig. 19 is a diagram of the electrical circuit connecting the controlling switch and motors.

The machine illustrated in the drawings is designed to store a plurality of phonograph records of the flat circular disc type in a carrier or magazine, and to individually feed these records successively to the playing position of a phonograph and remove the record after it has been played, restoring it to its original place in the magazine. These operations are all brought about automatically in proper timed relation, but the action of gravity is utilized in moving the record from its position in the magazine to the playing position and thence back to its original position in the magazine. In other words, the machine, having once been started in operation by the closing of the switch either by hand or by coin-controlled mechanism of any well known type, will automatically complete a cycle of operation which consists in selecting the next record to be played, feeding that record to playing position, removing the record from playing position when it has finished playing, and returning it to its original place in the magazine. During this cycle of operation, the reproducing device is automatically placed on the record at starting position and automatically removed from the record and restored by gravity to starting position ready for the next cycle of operation, the reproducing device serving at the end of its movement across the face of the record to automatically start the mechanism in operation for restoring the reproducing mechanism and returning of the record to the magazine.

The disc records A are carried in a rotary magazine H with their planes in radial relation to the axis of rotation of this magazine, as shown more clearly in Figs. 1 to 7. The magazine comprises, in general, two large wheels 1, arranged in parallel and spaced apart a sufficient distance to accommodate the diameter of the records. These wheels are fastened on a horizontal shaft 2 which is journaled in the upper ends of frame uprights 3 disposed outside at the front and rear of the magazine, so that the carrier or magazine rotates in a vertical plane.

The frame uprights 3 are mounted on top of the table 4 of a suitable frame 5. Beneath the table is mounted an electric motor 6 for driving the mechanism, Figs. 1 and 2. This motor has a pinion 7 on its shaft, which drives a large spur gear 8 journaled in suitable bearings in the frame.

The inner faces of the magazine wheels have a plurality of pairs of instanding ribs 9, Figs. 5, 6, and 7, which form between them slots or channels 10 for holding the records by engaging the diametrically opposite edges of said records. These slots 10 are radially disposed and are of sufficient size to permit the records to slide freely in and out thereof. The shaft 2 of the magazine has a sleeve 2a which serves as an inner stop for the records, the sleeve being preferably made of felt or other suitable cushioning material. The outer ends of the magazine slots are open so that the records can leave the slots and re-enter them in radial relation thereto and in the plane of themselves.

The records are releasably held in position in the magazine by retaining fingers 12 which are in the form of small levers individual to each record and pivoted at 13 on the inner side of the front magazine wheel 1. The outer ends of the fingers have upturned portions 14 which normally engage the edges of the records to hold the records in their respective slots. The inner ends 15 of the fingers are outwardly turned which engage an actuating stop in their path for the purpose of swinging the outer ends 14 of the fingers out of or into engagement with the records at the proper time to release the records from the magazine H or re-engage the records as they are returned to the magazine.

The playing position is represented by the rotary phonograph table C which is mounted in horizontal position in the frame 5 of the machine adjacent the magazine. This phonograph table and its driving motor C' may be of any standard or well known type and need not be further described, except to say that it has a central upstanding centering pin 16 which engages the central hole 17 of the usual or standard record. The motor C' is electrically operated. The starting and stopping of this motor and the phonograph table may be accomplished by coin-controlling mechanism, or any other suitable means well known in the art. For the purposes of this invention, the motor and phonograph table may run continuously since the mechanism for feeding records to and removing them from the table is accomplished while the phonograph table is in motion.

The playing table C is mounted lower than the magazine and is positioned at one side thereof in the plane of rotation of the magazine, so that the records when released from the magazine will move or discharge from the magazine by gravity. A movable chute or guideway B is arranged to direct the moving record from the magazine to the playing position on the phonograph table. This chute is arranged to swing vertically in the plane of rotation of the magazine. The chute comprises in general two parallelly disposed arms 20 rigidly connected at their outer ends by a cross member 21 and provided at their inner ends with bearings 22 which are journaled on the magazine shaft 2. Thus the chute swings vertically in the plane of the magazine and in concentric relation thereto. The inner faces of the arms 20 are spaced apart a distance substantially equal to the bottoms of corresponding opposed slots in the magazine so that the records will move freely in the chute and still be prevented from lateral movement. Guide rails 23 are mounted along the inside of the arms 20, being spaced from said arms by the spacers 24, for supporting the moving records on their upper edge, these upper edges being below the edges of the arms 20. The inner end of the chute begins slightly beyond the periphery of the magazine wheels 1, and, in the course of the operation of the machine is registered with the slots 10.

The outer end of the chute extends sufficiently beyond the transverse center line of the playing table so as to properly support a record while it is being placed on or removed from the table.

As shown more clearly in Figs. 3, 4 and 5, the chute swings down to a position with its outer end below the plane of the table, so that after having deposited the record on the table it leaves the record free to be rotated by said table. On account of the fact that in the discharging position the plane of the record is in angular relation to the horizontal plane of the playing table, the chute is curved accordingly. Thus, the inner portion of the chute adjacent the magazine is disposed in substantially the plane of a record in the magazine, while the outer end portion of the chute is arranged at such an angle that when the chute is in its lowered position this outer portion will be substantially horizontal and parallel with the plane of the playing table. A record leaving its position in the magazine will travel into the chute by gravity in the plane of itself until it is entirely clear of the magazine. Its movement then follows the curved path of the chute until it reaches the outer end portion of the chute and is placed on the table C in substantially horizontal position.

The chute is swung through the range of movement between its upper and lower positions by the motor 6, hereinbefore described. The arm 20 on the rear side of the machine has an extension 25 from its hub 22 and this extension is pivotally connected to a link 26 which extends to a crank connection 27 with the large gear 8. The front arm 20 has a similar extension 28 to which a spring 29 is connected, the spring being anchored as shown in Fig. 1 to the frame, for balancing the weight of the chute.

The record magazine and the chute are interlocked for simultaneous movement during a portion of the cycle of operation and disconnected for movement independent of the chute for the remainder of the cycle. This is accomplished by an automatic clutching device located at the rear side of the machine.

Referring more particularly to Figs. 4 and 8 to 11, it will be seen that the rear magazine wheel 1 carries an annular series of outstanding pins 30, each pin corresponding to the position of the record in the magazine. The pins are adapted to be engaged by a notched clutch member 31 carried on the end of an arm 32 which is fastened to a block 33 rotatable on the stud 34 on arm 20. The notched clutch member can be swung into and out of engagement with the pins 30. The clutch member is yieldingly held in the path of the pins 30 by a spring 35. The upper and lower edges 36 are curved to form cams so that as the clutch member is carried by the arm 20 of the chute into engagement with the pins, these cam edges will ride up on the pin 30 until the notch 37 of the clutch is reached, whereupon, under the action of the spring 35, the notch 37 will engage the pin 30, as indicated in dotted lines in Fig. 10, thus locking the magazine to the chute for simultaneous movement therewith.

In the upper or normal position of the chute, the clutch is held out of engagement with the pin 30 by a roller 38 on the end of a fixed arm 39 fastened to the frame upright 3, Fig. 9. The block 32 carries an arm 40 extending outwardly into position to engage the roller 38 and, on the last played, and the clutch member 31 is disconnected from the pin 30 of the magazine. Assuming, now, that the machine is to be started on a cycle of operation: The motor 6 is started and swings the chute downwardly. The magazine remains stationary because the clutch member is disconnected. During this downward movement of the chute, however, the arm 40 rides off of the roller 38 and allows the clutch member to swing into position to engage the next lower pin 30 in the series. When the clutch reaches and engages this next lower pin, it locks the magazine to the chute in register with the record in the position corresponding to the engaged pin 30. From this point, the magazine rotates with the chute.

Just before the chute reaches its lowest position, the end 15 of the retaining finger of the record in register with the chute engages the top edge 45 of a tripper arm 46, Figs. 1 and 3, mounted at the foot of the frame upright 3. This causes the retaining finger 12 to swing about its pivot out of engagement with the record and thus release the record. This releasing action is timed to occur just before the outer end of the chute reaches its final low position. The released record, on account of the angularity of its position, moves out of the magazine by gravity and travels by the force of its own momentum to the outer end of the chute reaching a position just above azine the ends 15 of the retaining fingers will pass the tripper arm 46 without being operated, simply by pushing the tripper arm aside as they engage it. Fig. 17 shows a retaining finger just passing over the top of the tripper arm. The tripper arm has a pin operating in a slot 48 in the end of an arm 49 which is fastened to the frame upright to limit the movement of the tripper arm 46.

Having completed its cycle of operation and returned the record to its original position in the magazine, the machine may be stopped with the chute in its upper position, ready to begin the next cycle of operation. In this normal or starting position, the retaining finger 12, for the record just returned to the magazine, remains in the position to which it was swung when it released the record. However, on the beginning of the downstroke of the chute for the next cycle of operation, indicated in the diagram Fig. 18, this retaining finger is restored to retaining position in engagement with the edge of the last record returned to the magazine. This is accomplished by an overhanging ledge portion 50 on the inside of the arm 20 of the chute, Figs. 3, 3a, and 18, this ledge engaging the end 15 of the finger as the chute starts downwardly. This swings the finger to retaining position and its end 15 then rides off of the ledge 50. Fig. 18 shows the ledge 50 just passing beyond the finger after having actuated it.

Referring again to the stage of operation in which the chute is just approaching its lower position in the act of placing the record on the phonograph table C. A transverse shaft 55 is journaled in the side arms 20 of the chute and carries a pair of spaced stops 56 which are positioned just below the level of the guide rails 23 of the chute, as shown more clearly in Figs. 3, 4 and 5, so that the moving record will pass over these stops on the way to the playing position. However, the outer end portions 23' of the guide rails are lower than the remaining supporting surfaces of said guide rails, being cut away beginning at the shoulders 57, Figs. 3 and 5, so that when the record reaches the outer end of the chute in position over the phonograph table, it rides off of these shoulders and drops onto the lower end portions 23'. This places the record in line with the stops 56 to prevent the record from moving in a reverse direction in the chute. The stops, as will later appear, hold the record in the outer portion of the chute during the restoring or upward movement of the chute until said stops are actuated to release the record.

Mounted on the cross member 21 of the chute is a bumper arm 60. This arm is pivoted at one end 61 and its other end is connected to the cross member by the spring 62, which spring yieldingly urges the bumper arm toward the record. The bumper arm has a cushion 63 lying in the plane of the record, against which cushion the forward edge of the record strikes. The momentum acquired by the record when being discharged by gravity from the magazine is sufficient to tend to carry the record beyond the outer end of the chute, but the bumper arm 60 acts as a stop to prevent this outward movement. The shock of the record striking the bumper is yieldingly absorbed by the spring 62. The momentum of the record is, however, sufficient to swing the bumper arm 60 outward to some extent, allowing the record to slightly override its playing position, but the spring 62 immediately takes up this overriding movement by moving the record in the reverse direction. Since by this time the record has dropped onto the depressed portion 23 of the guide rails, it will be moved in this slightly reverse direction against the stops 56. Thus, the record for an instant will be yieldingly clamped between the bumper arm 60 and the stops 56. These operations, resulting in the clamping of the record between the bumper arm and stops, as just described, takes place slightly before the chute reaches its lowermost position and while the record is still slightly above the end of the centering pin 16 of the phonograph table.

The stops 56 are spaced from the centering pin a distance slightly greater than the radius of the record, so that when the record is clamped between the bumper arms and the stops 56 its central hole 17 is not quite centered with respect to the pin 16, but the pin 16 is tapered to a point, and, as the point of the pin enters the hole 17 of the record, the taper on the pin serves as a cam to force the record slightly away from the stops 56. Hence, when the record reaches its resting position on the phonograph table, it will be centered with respect to said table. The downward movement of the chute, however, continues a slight distance farther so that the stops 56 are actually carried below the plane of the record as the record rests on the phonograph table, thereby clearing the record so that the stops will not drag and retard its rotation. The slight cam action by the taper pin 16 is sufficient to move the record out of the vertical path of the stops, so that when the chute again starts upwardly the stops 56 will be carried upwardly again into the path of the record just prior to the lifting of the record off of the phonograph table.

During the final downward movement of the chute, just about at the instant the record is centered in position on the phonograph table, the free end of the bumper arm 60 engages a curved upstanding cam member 65 fixed on the frame of the machine. This cam member forces the bumper arm outwardly against the tension of spring 62, disengaging the bumper arm from the edge of the record so that it will not drag on the record during the playing operation. On the upward movement of the chute, the bumper arm rides off the cam member 65, again engaging the edges of the record and clamping the record between itself and the stops 56. The record is thus retained in the outer end portion of the chute until the chute approaches its upper position, at which point the shaft 55 is rotated to release the record from the stops so that it can return to its position in the magazine.

The shaft 55 has at one end an arm 66 which is pivotally connected by a link 67 to one arm of a lever 68. This lever is pivoted at 69a on the arm 20 of the chute adjacent the main shaft 2, Figs. 1, 3, 4 and 5. The other arm of the lever 68 is adapted to engage a fixed member 69 which stands in its path and which is mounted on the frame upright 2. These parts are so proportioned that the lever 68 will be swung about its pivot by the member 69 just as the chute reaches its upper or normal position, and through the medium of the link 67 rotates the shaft 55 to release the record for its return movement. The release of the record is accomplished by two fingers 70 mounted on the shaft 55 and extending beneath the record. As the shaft 55 is rotated, the fingers raise the record above the shoulders 57 to the level of the guide rails 23, and also above the stops 56. The record is thus free to start moving by gravity down the chute to the magazine. The bumper arm 60 follows the record on its return movement until it strikes a fixed stop 71 on the cross member 21, against which it is yieldingly held by the spring 62 ready to be engaged by the next record on the next cycle of operation.

The reproducer E is carried by an arm D which is pivoted on a vertical axis in a bracket 75 fastened to the rear arm 20 of the chute, Figs. 12, 13 and 14. This arm D extends vertically upward from its pivotal connection to a point above the chute and then extends horizontally over the record. The arm can swing in a plane parallel to the record in the outer end of the guide chute. At the free end of the arm D is another arm D—1 which is pivoted at 76 to the end of the arm D to swing in a vertical plane whereby the reproducing device can be raised and lowered with respect to the record. The outer end of this outer arm D—1 carries the reproducing device E. This reproducing device E has a needle 77 which travels in the grooves in the face of the record in the usual manner. The reproducer E may be of any well known type for the purpose; that which is shown in the drawings is intended to be of the type which is electrically connected to the suitable loud speaker.

The reproducer is lowered into or raised out of engagement with the face of the record at the proper stages in the cycle of operation. The arm D carries a lever 78 which is pivoted at 79 to swing in a plane parallel to the plane of pivotal movement of the arm D—1. The short arm of this lever 78 extends toward the arm D—1 and its end 80 is turned beneath said arm D—1 to engage and swing said arm about its pivot. The long arm of the lever 78 extends beyond the reproducer arm D and carries a roller 81 at its end which engages a fixed stop 82 mounted on a frame 5, Fig. 2. A spring 83, connected between the vertical portion of the arm D and the lever 78, Fig. 12, normally pulls downwardly on the lever 78 to swing the reproducer upwardly away from the record.

On the downward movement of the chute, just as the record is being placed on the table and centered in position, the roller end 81 of the lever engages the stop member 82 and swings the lever on its pivot against the tension of the spring 83. This lowers the arm D—1 and reproducer E to rest the needle 77 on the record. The end 80 of the arm 78 leaves the arm D—1 a slight distance so as to be entirely clear thereof and not interfere with the slight movements of the reproducer due to the undulations in the record. On the upward movement of the chute, after the record has been played, the roller end 81 of the arm 78 is lifted clear of the stop 82, and, under the action of the spring 83, this arm swings the reproducer E upwardly to raise the needle from the record. The reproducer is thus held elevated until the chute again lowers to place another record on the phonograph table. The stop member 82 is of considerable length to allow for the swinging of the arm D about its vertical pivot.

In the standard types of records, the playing operation starts adjacent the outer edge of the record and finishes adjacent the center of the record. The reproducer in following the grooves in the record moves across the face of the record from the outer edge to the inner end thereof, and the arm D is swung on its vertical pivot accordingly. When the chute swings upwardly, the pivotal axis of the arm D is gradually turned at an angle to the vertical, and by the time the chute reaches its upper position this pivotal axis will have been turned sufficiently to render the arm and reproducer subject to the action of gravity, and the arm will be thus swung by gravity on its pivotal axis to a position corresponding to the outer edge of the record. This position is determined by an adjustable limit stop 84 mounted on a bracket on the arm 20 of the chute, Fig. 5, and adapted to engage the vertical portion of the arm D. When the chute is again lowered to play the next succeeding record, the reproducer and arm will be in position corresponding to the start of the playing operation, ready to be simply lowered onto the record at the proper time, as shown in full lines in Fig. 5. Thus, the reproducer is restored to starting position after each playing operation by the action of gravity.

The swinging of the reproducer arm from starting position to stopping position, and vice versa, is utilized to operate switch mechanism for starting and stopping the motor 6 at the proper time. On the rear side of the frame of the machine is a suitable switch base 85 having an elongated and curved electrical contact 86. A switch lever 87 is also mounted on this base. This switch lever is pivotally related to a block 88 by means of the pivot bolt 89, and the block 88 is pivotally mounted on the base 85 by means of the pivot bolt 90, the axis of which is disposed at right angles to the axis of the pivot bolt 89. The switch lever 87 thus has two pivotal movements, namely, a vertical swinging movement on the pivot bolt 89 to raise and lower its contact 91 with respect to the fixed contact 86, and a horizontal swinging movement about the vertical pivot 90, as shown in Figs. 12, 13 and 14. The lower end of the vertical portion of the arm D has an arm extension 92 which swings, with said arm D, about the pivotal axis of said arm D. The switch lever 87 has a small overhanging clip or ear 93, and the end of the extension 92 likewise has a similar overhanging ear 94. On the base 85, beneath the lever 87, is an upstanding cam or inclined member 95, on which the lever 87 rides and which operates to swing the lever 87 upwardly about its pivot 89 to raise the ear 93 above the level of the ear 94. This permits the ear 94 to be swung into a position beneath the ear 93. This ear 94 is swung to this position by the movement of the reproducer arm D as said arm is swung upon its vertical axis by the action of the needle in following the grooves of the record. As the needle approaches the inner ends of the record groove, the ear, as indicated in dotted lines in Fig. 13, engages the side of the lever 87 and moves this lever about its vertical pivot 90 until said lever 87 rides down the cam incline 95. This action continues until the ear 93 rests on top of the ear 94. Due to the eccentric relation between the pivot 90 and the vertical pivot of the arm D, the ears will have a lateral movement relatively to each other, which movement continues until the ear 93 slips off of the edge of the ear 94 and permits the ear 93 and the switch lever 87 to drop. The switch lever 87 will then be free to slide further down the cam 95 until its contact 91 engages the contact 86. This closes the circuit for the motor 6 and starts the machine in operation to swing the chute upwardly. The slipping off or disengagement of the ear 93 from the ear 94 corresponds to the position which the reproducer reaches when the playing operation is to be stopped, and the ears 93 and 94 are both mounted by means of pin and slot connections on their respective arms, so that they may be accurately adjusted to disengage at the proper time.

Standard records are generally provided with either of two types of grooves in their center portions for operating stopping mechanism. In Fig. 6 these two types of grooves are illustrated. In the upper record in this figure, the groove A—1 is known as the spiral type, while the groove A—2 in the lower record is known as the eccentric type. In either type of record, the needle after finishing the playing operation continues in either the spiral or the eccentric groove to swing the arm D still further for the purpose of operating the stopping mechanism. The present structure is adapted to operate in connection with both of these types of records, and the ears 93 and 94 are adjusted so that they disengage accordingly.

The contacts 86 and 91 remain in engagement until the chute has been swung to its upper position, and if the switch F, Fig. 20, remains closed, the motor 6 will continue in operation and swing the chute downwardly on the next cycle of operation. The rear side of the chute has a downwardly extending finger 96, Fig. 12, which is adapted to engage the end of a restoring lever 97 pivoted at 98 on the switch base 85. The finger 96 swings the restoring lever 97 into engagement with the free end of the switch lever 87, as indicated in dotted lines in Fig. 13, rotating the switch lever 87 about its pivot 90 and causing it to ride up on the cam 95. This lifts the contact 91 off of the contact 86 and opens the circuit for the motor, thereby stopping the mechanism. Engagement of the finger 96 with the restoring lever 97 takes place as the chute approaches its lowermost position. In order that this operation may be timed accurately, the restoring lever 97 has an adjustable lug 99 thereon for adjusting its engagement with the switch lever 87. On account of the angular position of the finger 96 on the chute and the fact that it moves in an arcuate path with the chute, it moves the restoring lever until the switch lever is restored and then leaves the end of the restoring lever, as indicated in dotted lines in Fig. 13. This releases the restoring lever which is snapped back to its normal position by means of the spring 100 connected to the lever and to the switch base 85, thus positioning the restoring lever for the next operation. On the upward movement of the chute, however, the finger 96 re-engages the end of the restoring lever 97 and swings it in the opposite direction until it passes the end of said lever, but the movement of the lever 97 in this direction is simply for the purpose of allowing the finger 96 to pass it.

The switch F, indicated in Fig. 19, is simply representative of any main switch for controlling the circuit. If the switch F is allowed to remain closed, the operation of the mechanism will be solely under the control of the switch contacts 86 and 91 and the mechanism will operate continuously. If, however, the switch F is associated with any of the usual or well known types of coin-controlling mechanism, it will be opened when the chute reaches its uppermost position after each cycle of operation.

While I have shown one embodiment of the invention in the drawings, it will be understood that changes may be made in the construction, operation and arrangement of the parts, without departing from the spirit of the invention, and I contemplate such changes as fairly fall within the scope of the appended claims.

I claim:—

1. In a phonograph record feeding mechanism, the combination of a supporting framework with a rotatable record carrier mounted for rotation upon a horizontal axis, with a turn table for receiving a record to be played, a movable chute and means for operatively securing said chute to said carrier to swing therewith, said turn table being located below the discharging position of said record carrier, and said chute extending from said record carrier to said turn table in one position of said chute, whereby records may be moved by gravity from said record carrier to said turn table.

2. In a phonograph record feeding mechanism, the combination of a supporting framework with a rotatable record carrier mounted for rotation upon a horizontal axis, with a turn table for receiving a record to be played and a movable chute adapted to convey said record from said carrier to said turn table, said turn table being located below the discharging position of said record carrier, and said chute extending from said record carrier to said turn table in one position of said chute, whereby records may be moved by gravity from said record carrier to said turn table, and means for moving said chute to an elevated position, means on said chute adapted to engage a record on the turn table and elevate it when said chute is elevated, whereby a record removed from said turn table by said chute is returned to said record carrier by gravity.

3. In a phonograph record feeding mechanism, the combination of a rotary magazine having records disposed radially therein with relation to the axis of rotation of said magazine, a record playing table in substantially parallel relation to said axis of rotation, a movable chute positioned between the magazine and the table movable to different positions and adapted when in one position to direct a record from the magazine to the table and when in another position to direct the record into the magazine, and means for registering the chute with a predetermined record located above the table in said magazine.

4. In a phonograph record feeding mechanism, the combination of a rotary magazine having records disposed therein in substantially parallel relation to the axis of rotation of said magazine, a record playing table in substantially parallel relation to said axis of rotation, a movable chute positioned between the magazine and the table movable to different positions and adapted when in one position to direct a record from the magazine to the table and when in another position to direct the record into the magazine, means for registering the chute with a predetermined record above said table in said magazine, and means controlled by the record for operating said registering means.

5. In a phonograph record handling mechanism, the combination of a support with a turn table for supporting a record during play, and a record carrier rotatably mounted on said support, said record carrier having a multiplicity of shoulders for supporting records, and said record carrier supporting predetermined records above the level of said turn table, a chute carried by said support and extending from a point adjacent said record carrier to a point adjacent said turn table, said chute comprising guides for slidably engaging the bottom and edges of a record, whereby the record may move by gravity from said record carrier to said turntable, and means for securing said chute to said carrier to swing therewith.

6. In a phonograph record handling mechanism, the combination of a support with a turn table for supporting a record during play, and a record carrier rotatably mounted on said support, said record carrier having a multiplicity of shoulders for supporting records, and said record carrier supporting predetermined records above the level of said turn table, a chute carried by said support and extending from a point adjacent said record carrier to a point adjacent said turn table, said chute comprising guides for slidably engaging the bottom and edges of a record, whereby the record may move by gravity from said record carrier to said turn table, means for securing said chute to said carrier to swing therewith, and means actuated by the movement of said chute into record receiving position, to release a record from said carrier to said chute.

7. In a phonograph record handling mechanism, the combination of a support with a turn table for supporting a record during play, a record carrier carried by said support, said record carrier having a multiplicity of shoulders for supporting records, and said record carrier supporting predetermined records above the level of said turn table, a chute carried by said support and extending from a point adjacent said record carrier to a point adjacent said turn table, said chute comprising guides for slidably engaging the bottom and edges of a record, whereby the record may move by gravity from said record carrier to said turn table, means for elevating said chute with a record from said turn table above the plane of a predetermined record supporting shoulder on said carrier, whereby the record is returned by gravity to said record carrier.

8. In a phonograph record handling mechanism, the combination of a support with a turn table for supporting a record during play, and a record carrier rotatably mounted on said support, said record carrier having a multiplicity of shoulders for supporting records, and said record carrier supporting predetermined records above the level of said turn table, a chute carried by said support and extending from a point adjacent said record carrier to a point adjacent said turn table, said chute comprising guides for slidably engaging the bottom and edges of a record, whereby the record may move by gravity from said record carrier to said turn table, a reproducer for said turn table, means for securing said chute to said carrier to swing therewith, and a reproducer arm for supporting said reproducer, said arm being movably mounted on said chute, whereby said reproducer is returned to initial record starting position by elevation of said chute above said turn table.

9. In a phonograph record feeding mechanism, the combination of a supporting framework with a rotatable record carrier mounted for rotation upon a horizontal axis, with a turn table for receiving a record to be played and a movable chute adapted to convey said record from said carrier to said turn table, said turn table being located below the discharging position of said record carrier, said chute extending from said record carrier to said turn table in one position of said chute, whereby records may be moved by gravity from said record carrier to said turn table, means for moving said chute to an elevated position, means on said chute adapted to engage a record on the turn table and elevate it when said chute is elevated whereby a record removed from said turn table by said chute is returned to said record carrier by gravity, a reproducer above said turn table, said reproducer being mounted upon a reproducer arm pivotally carried by said chute, and an electric motor for actuating said chute and an electric switch controlled by the movement of said reproducer arm for controlling said motor.

10. In a phonograph record handling mechanism, the combination of a support with a turn table for supporting a record during play, a record carrier carried by said support, said record carrier having a multiplicity of shoulders for supporting records, said record carrier supporting predetermined records above the level of said turn table, a chute carried by said support and extending from a point adjacent said record carrier to a point adjacent said turn table, said chute comprising guides for slidably engaging the bottom and edges of a record, whereby the record may move by gravity from said record carrier to said turn table, said chute being gradually curved between said record carrier and said turn table to change the direction of the plane of said record from the position of the record in the carrier to that of the turn table.

11. In a phonograph record handling mechanism, the combination of a support with a turn table for supporting a record during play, and a record carrier carried by said support, said record carrier having a multiplicity of shoulders for supporting records, and said record carrier supporting predetermined records above the level of said turn table, a chute carried by said support and extending from a point adjacent said record carrier to a point adjacent said turn table, said chute comprising guides for slidably engaging the bottom and edges of a record, whereby the record may move by gravity from said record carrier to said turn table, means for gradualy stopping a record above said table at a position beyond that of registry with said turn table and returning it towards said position, and means for arresting said record in said position of registry.

12. In a multiple record feeding mechanism for phonograph records, the combination of a horizontally disposed record playing table, a record carrier adjacent said table rotatable in a vertical plane and having a plurality of records in radial relation to its axis of rotation, a guideway positioned between the carrier and the table and movable in said vertical plane, means for moving the guideway to an angular position relatively to the carrier and table whereby a record will move by gravity from the carrier to the table along said guideway, means for changing the angular position of said guideway to lift the record from the table and cause it to move by gravity in the reverse direction along said guideway and toward the carrier, and means for moving the carrier in register with the guideway to receive the record in its original position in the carrier.

13. In a multiple record feeding mechanism for phonograph records, the combination of a horizontally disposed record playing table, a record carrier adjacent said table and rotatable in a vertical plane and having a plurality of records in radial relation to its axis of rotation, a guideway positioned between the carrier and the table and movable in said vertical plane, means for moving the guideway to an angular position relatively to the carrier and table whereby a record will move by gravity from the carrier to the table along said guideway, means for changing the angular position of said guideway to lift the record from the table and cause it to move by gravity in the reverse direction along said guideway and toward the carrier, means for moving the carrier in register with the guideway to receive the record in its original position in the carrier, a reproducing device cooperable with the record on the table, and driving mechanism for said carrier moving means controlled by the movement of said reproducer.

14. In a multiple record feeding mechanism for phonograph records, the combination of a playing table for the records, a rotary carrier having a plurality of radial slots for receiving records in radial relation to the axis of rotation of said carrier, holding means for retaining the records in position in said carrier, means actuating said retaining means to release a record from said receiving slots, a rotary chute for directing the released record onto said playing table, means for rotating said chute to lift the record from the playing table and elevate it to a point where it will move by gravity along said chute, and means for maintaining the carrier in register with said chute to receive the record in its original position.

15. The combination of a rotary magazine, a guide chute rotatable about the axis of said magazine in which chute the records travel by gravity, means for positioning the chute relatively to the magazine to direct the moving record into playing position on a turn table, and means for releasing the record from the magazine when the chute is in position.

16. The combination of a rotary magazine, a guide chute in which the records travel by gravity, means for positioning the chute relatively to the magazine to direct the moving record into playing position on a turn table, means for releasing the record from the magazine when the chute is in position, means for elevating the chute to reverse the direction of travel of the record therein by gravity, and means for retaining the record in the chute until it reaches its elevated position.

17. The combination of a rotary magazine, a guide chute in which the records travel by gravity, means for positioning the chute relatively to the magazine to direct the moving record into playing position on a turn table, means for releasing the record from the magazine when the chute is in position, means for elevating the chute to reverse the direction of travel of the record therein by gravity, means for retaining the record in the chute until it reaches its elevated position, and means for registering the chute and magazine in both positions of the chute so that the record returns to its original position in the magazine.

18. The combination of a multiple record magazine rotatable in a vertical plane and having the individual records disposed therein in radial relation, a guide chute rotatable in the plane of the magazine about the axis thereof, said chute being movable to different positions whereby a record will travel therein by gravity, means for discharging a record into the chute from the magazine when the chute is in position to direct the record into playing position on a playing table, and means for releasing the record in the chute upon the arrival of the chute in a position to direct the moving record into the magazine.

19. The combination of a rotary record playing table, means for removing a played record from said table, a reproducing device movable across the face of the record, a pivotally mounted switch arm for controlling said means, a member eccentrically pivoted relative to said arm and adapted to engage said arm to hold it out of operative position, and means operatively connecting said member to the reproducing device to cause it to move progressively as the reproducing device moves over the record being played, the relative mounting of said arm and member being such that the arm is released when the reproducing device reaches a predetermined position on the face of the record.

20. The combination of a rotary record playing table, means for removing a played record from said table, a reproducing device movable across the face of the record, a pivotally mounted switch arm for controlling said means, a member eccentrically pivoted relative to said arm and adapted to engage said arm to hold it out of operative position, means operatively connecting said member to the reproducing device to cause it to move progressively as the reproducing device moves over the record being played, the relative mounting of said arm and member being such that the arm is released when the reproducing device reaches a predetermined position on the face of the record, and means for restoring said switch arm to inoperative position.

JOHN A. FERN.